(12) United States Patent
Varanasi et al.

(10) Patent No.: US 6,207,284 B1
(45) Date of Patent: Mar. 27, 2001

(54) METAL NITRIDES AS PERFORMANCE MODIFIERS FOR GLASS COMPOSITIONS

(75) Inventors: Srikanth Varanasi, Toledo; Paige L. Higby, Maumee; Gwendolyn A. Young, Toledo, all of OH (US)

(73) Assignee: Libben-Owens-Ford Co., Toledo, OH (US)

( * ) Notice: Subject to any disclaimer, the term of this patent is extended or adjusted under 35 U.S.C. 154(b) by 0 days.

(21) Appl. No.: 09/175,819

(22) Filed: Oct. 20, 1998

Related U.S. Application Data

(60) Provisional application No. 60/062,528, filed on Oct. 20, 1997.

(51) Int. Cl.[7] ............................... B32B 17/00; C03C 4/10
(52) U.S. Cl. ............................ 428/426; 501/56; 501/70; 501/71; 501/904
(58) Field of Search ................................. 501/32, 56, 70, 501/71, 29, 904, 27; 428/426

(56) References Cited

U.S. PATENT DOCUMENTS

| | | |
|---|---|---|
| 1,961,603 | 6/1934 | Berger . |
| 3,944,352 | 3/1976 | Morgan . |
| 4,035,548 * | 7/1977 | Chang et al. ................ 428/412 |
| 4,713,359 | 12/1987 | Lubelski et al. . |
| 4,792,536 | 12/1988 | Pecoraro et al. . |
| 5,077,133 | 12/1991 | Cheng . |
| 5,508,236 | 4/1996 | Chiang et al. . |

FOREIGN PATENT DOCUMENTS

4042224134A * 8/1992 (JP) .

* cited by examiner

*Primary Examiner*—Deborah Jones
*Assistant Examiner*—Stephen Stein
(74) *Attorney, Agent, or Firm*—Marshall & Melhorn, L.L.C.

(57) ABSTRACT

Silicate based glass compositions with nitrogen compounds are included in the composition as performance modifiers to impart desirable color and improved energy absorbance properties. The nitrogen compound is, generally, a metal nitride which is added to the batch glass composition in amounts greater than 0.05 weight percent prior to melting the composition and method resulting in a finished glass suitable for use in architectural and automotive glazings.

6 Claims, No Drawings

METAL NITRIDES AS PERFORMANCE MODIFIERS FOR GLASS COMPOSITIONS

This application is claiming the benefit, under U.S.C. § 119(e), of the provisional application filed Oct. 20, 1997 under 35 U.S.C. § 111(b), which was granted Ser. No. 60/062,528. The provisional application, 60/062,528 is hereby incorporated by reference.

BACKGROUND OF THE INVENTION

1. Field of the Invention

The present invention is directed to silicate based glass compositions with nitrogen compounds included in the composition as performance modifiers and the methods of making the composition and glass articles formed therefrom. More particularly, the present invention is directed toward the use of metal nitrides in silicate based glasses for the improvement of spectral properties such as the absorption of infrared energy.

2. Summary of Related Art

Performance modifiers and colorants are often added to base glass compositions to impart specific color and energy transmittance properties in the finished glass. The absorption of energy at specific wavelengths is often desirable to enable various uses for the glass compositions. Additionally, certain colors are preferred for various glasses for aesthetic reasons. There are limitations within specific glass compositions that must be balanced or optimized when attempting to achieve desired color and energy transmittance properties. For example, certain ingredients may improve the absorption of near infrared energy while imparting an undesirable color or reducing the light transmittance. Thus, the optimization of a specific color or energy transmittance property often negatively impacts other desirable transmittance properties.

The present invention utilizes metal nitrides in silicate based glass compositions to improve either color or energy transmittance properties of the finished glass. The use of a metal nitride results in the unexpected improvement of color and energy transmittance properties when added to conventional silicate based glass compositions. Different metal nitrides will impact the silicate based glass in different manners. Thus, the selection of a specific metal nitride is dependent upon the silicate based glass composition, the additional colorants in the composition, and the desired color or energy transmittance properties. For example, the inclusion of a metal nitride in a soda-lime-silica glass, containing an iron colorant, exhibits a reduction in the transmittance of near infrared energy over similar non-nitride containing compositions, without adversely affecting the visible light transmittance.

Silicate based glass batch compositions recognized within the art may include nitrogen compounds in the form of nitrates. Sodium nitrate, or niter, is generally utilized to improve the retention of the colorant selenium in the finished glass. The nitrate does not improve the spectral performance of the finished glass.

Also, infrared absorbing, or heat reducing, silicate glasses are known within the art. In general, infrared absorbing silicate glasses involve the addition of specific colorants that impact the color and energy transmittance properties of the glass.

For example, U.S. Pat. No. 4,792,536 discloses a process for producing an infrared energy absorbing glass, containing a low total iron concentration which is highly reduced to FeO. It is further disclosed that the infrared energy absorption can be increased by including greater amounts of total iron in the glass composition, but states that the visible light transmittance would thereby be reduced below levels considered adequate for automotive glazings. The patent teaches that the iron must be at least 35% reduced to FeO.

Another example of an infrared absorbing silicate glass is found in U.S. Pat. No. 5,077,133. The patent discloses a green colored infrared and ultraviolet absorbing silicate glass which includes an amount of ceric oxide, or alternatively ceric oxide and titanium dioxide, and a high concentration of moderately reduced iron. The glass composition exhibits a visible light transmittance of at least 70% and a total solar energy transmittance of less than 46%. Although the glass composition exhibits a low solar energy transmittance, it is desirable to further reduce the total solar energy transmittance, through the absorption of near infrared energy, while maintaining the high visible light transmittance.

It would be an advantage to provide a performance modifier for use in a silicate glass composition that significantly improves color and energy transmittance values without adversely impacting other transmittance properties in the finished glass.

SUMMARY OF THE INVENTION

According to the present invention, there is provided a nitrogen compound suitable for use in a silicate batch glass composition as a performance modifier to impart improved color and energy transmittance properties over conventional silicate glasses. The nitrogen compound is generally a metal nitride which is added to the batch glass composition prior to melting. The present invention also includes a process for melting the glass batch composition and the articles produced therefrom.

The preferred metal nitrides suitable for use in the present invention are selected from the group consisting of aluminum nitride, barium nitride, boron nitride, calcium nitride, chromium nitride, copper nitride, gallium nitride, germanium nitride, hafnium nitride, iron nitride, lithium nitride, magnesium nitride, neodymium nitride, potassium nitride, silicon nitride, sodium nitride, strontium nitride, tantalum nitride, titanium nitride, tungsten nitride, vanadium nitride, zinc nitride, and zirconium nitride. Each of the metal nitrides may impart different characteristics to the finished silicate glass. Therefore, the selection of the metal nitride is dependant upon the desired color and energy transmittance properties of the finished glass as well as the base glass composition and other colorants included in the base glass composition. Additionally, several of the noted performance modifiers may be utilized in combination in the glass batch composition.

The metal nitrides of the present invention are added to the batch glass composition prior to the admixing, heating, and melting of the batch. The metal nitrides are included in the batch glass composition at concentrations from about 0.05% to about 4% by weight. The most preferred compounds included in glass compositions are aluminum nitride, boron nitride, iron nitride, magnesium nitride, silicon nitride, titanium nitride, and zinc nitride.

It is an object of the present invention to provide a performance modifier for use in silicate batch glass compositions that improves color or energy transmittance properties of the finished glass composition. The metal nitrides of the present invention are suitable performance modifiers that are capable of improving the color and energy transmittance properties of the glass over conventional silicate glasses.

It is also an object of the present invention to utilize a metal nitride in a glass composition to improve specific color or energy absorbance properties without adversely affecting other properties, such as the visible light transmittance.

DETAILED DESCRIPTION OF THE PREFERRED EMBODIMENT

In accordance with the present invention, it has been discovered that a nitrogen compound may be included in a silicate based batch glass composition as a performance modifier to improve energy transmittance properties of the finished glass. The nitrogen compound is generally a metal nitride added to conventional silicate glass compositions.

It is desirable to improve solar attenuation properties in glass to improve the efficiency and expand the use of the resulting glass articles. In addition to the solar attenuation properties, specific colors are often desired in finished glass compositions. The metal nitrides of the present invention can significantly impact one or both of the color and solar attenuation properties of the finished silicate glass.

The present invention is suitable for use in silicate glasses. Silicate glasses are generally glasses which utilize silicon as the network former. The network former is the primary cation which bonds with oxygen to create the amorphous network. In general, silicate glasses are glasses having over 40% silica in the composition. Thus, silicate glasses can include other cations in the glass composition, such as aluminum, sodium, calcium, magnesium, phosphorus, and boron. Silicate glasses are preferred because their physical properties enable the production of the glass in a float glass production process.

A preferred silicate glass is a soda-lime-silica composition. The composition of soda-lime-silica glasses suitable for use in accordance with the present invention typically have the following weight percentage constituents:

| | |
|---|---|
| $SiO_2$ | 65–80% |
| $Na_2O$ | 10–20 |
| CaO | 5–15 |
| MgO | 0–10 |
| $Al_2O_3$ | 0–5 |
| $K_2O$ | 0–5 |
| BaO | 0–5 |
| $B_2O_3$ | 0–5 |
| $Ga_2O_3$ | 0–5 |

Other minor ingredients, including conventional melting and refining aids such as sulfur compounds (measured as $SO_3$), may also appear in the glass composition at levels up to 1 weight percent without affecting the properties of the finished glass composition. Suitable raw materials for producing a soda-lime-silica glass include, sand, limestone, dolomite, soda ash, salt cake or gypsum, and niter. Niter, or sodium nitrate, may also be utilized in the glass batch composition with the colorant selenium to improve retention of selenium in the finished glass.

The silicate based glass compositions, to which the metal nitrides of the present invention are added, may include conventional colorants. In addition to coloring the glass, the colorants may also impart certain energy attenuation properties such as the absorption of infrared and ultraviolet radiation. The metal nitrides of the present invention, when included with the known colorants, can affect the color and energy transmittance properties beyond anticipated effects generally recognized with the colorants alone.

In accordance with the present invention, one or more metal nitrides are added to the silicate batch glass composition. The metal nitrides are preferably selected from the group consisting of aluminum nitride, barium nitride, boron nitride, calcium nitride, chromium nitride, copper nitride, gallium nitride, germanium nitride, hafnium nitride, iron nitride, lithium nitride, magnesium nitride, neodymium nitride, potassium nitride, silicon nitride, sodium nitride, strontium nitride, tantalum nitride, titanium nitride, tungsten nitride, vanadium nitride, zinc nitride, and zirconium nitride. The metal nitrides may be added up to about four weight percent in the silicate batch glass composition prior to melting. The most preferred compounds included in glass compositions are aluminum nitride, boron nitride, iron nitride, magnesium nitride, silicon nitride, titanium nitride, and zinc nitride.

The preferred embodiment of the present invention is the use of one or more metal nitrides with iron-containing compounds, as a colorant, in a silicate batch glass composition. The combination of the metal nitrides with iron-containing compounds, having a total iron content, measured as $Fe_2O_3$, of about 0.1 to 4.5 weight percent, improves the absorption of infrared energy without adversely impacting the visible light transmittance. Thus, the metal nitrides are capable of increasing the difference between the visible light transmittance and the direct solar heat transmittance over conventional glasses utilizing iron alone, such that a glazing produced from a suitable batch glass composition has an Illuminant A visible light transmittance greater than 70% and a direct solar heat transmittance less than 44% at a nominal thickness of 3–6 mm. For certain applications a glazing having a visible light transmittance greater than 75% and a direct solar heat transmittance less than 49% would be desirable, and such properties can be achieved with the batch glass compositions of the present invention.

Iron nitride is most preferred metal nitride as it provides both the iron and the nitride in the glass batch composition. Iron nitride compounds suitable for use as performance modifiers may be expressed as $Fe_xN$, where x=1–4.

The metal nitrides included in the silicate glass batch composition are admixed, heated, and melted to form the finished glass. Conventional glass batch mixing devices are utilized in compounding the ingredients. The batch materials are conveniently melted together in a conventional glass making furnace, to form a silicate glass composition, which thereafter may be continuously cast onto the molten metal bath in a float glass production process.

The glasses produced in accordance with the present invention are suitable for various applications, including automotive and architectural glazings. Examples of automotive applications would include windshields, side lights, and backlights of various thicknesses and energy transmittance properties. Additionally, the combination of colorants used in conjunction with the metal nitrides may be selected to produce various shades of glass, such as for example clear, green, blue, blue-green, gray, dark gray, and bronze glasses.

The following examples in Table I illustrate glass compositions in accordance with the invention that are readily formed into glass articles or glazings. Each example includes a soda-lime-silica base glass composition prepared in accordance with the present invention. The specific metal nitride performance modifier and colorant compositions are noted for each example.

The examples were prepared by weighing the noted ingredients, colorants, and performance modifiers on a Mettler balance. The colorants and performance modifiers were added to a conventional base glass batch composition including sand, dolomite, limestone, soda ash, and gypsum. The ingredients were thoroughly mixed to provide a homogeneous mixture and then placed in a high temperature crucible. The crucibles were then placed in a gas-fired furnace. The temperature of the furnace was slowly ramped to 2600° F. and held at that temperature for over four hours. During the high temperature holding step, the crucibles were removed after two and one half hours and the melt was stirred. The crucibles were then placed back into the furnace for the remaining one and one half hours. Upon completion of the melting phase, the crucibles were removed from the furnace. The molten samples were poured into a 2"×4" graphite mold to form glass slabs. The slabs were immediately transferred to an annealer operating at 1150° F. and held for one to two hours. The slabs were then cooled overnight in the furnace.

The transmittance values for each of the slabs were measured on a Perkin Elmer Lambda 19 Spectrophotometer. The spectral data was collected and then utilized to calculate the optical values for Illuminant A (Ill A), direct solar heat transmittance (DSHT), ultraviolet radiation transmittance (Tuv), and CIE color scale coordinates (L*, a*, and b*). The optical values were calculated in accordance with the ASTM E 308-90 test method for computing the colors of objects by using the CIE system (Ill C two degree observer) and Parry Moon solar energy distribution curve at an air mass of 2.0.

Comparative examples are also included in the examples. The comparative examples are conventional glass compositions of similar color without the use of metal nitrides in the batch composition.

The examples illustrate but do not limit the invention. In the examples, all parts and percentages are by weight and:

(a) $Fe_2O_3$, $TiO_2$, $Fe_xN$ (x=1–4), $Si_3N_4$, TiN, and $Zn_3N_2$ are expressed in percent; $Co_3O_4$, Se, NiO, are expressed in parts per million (ppm);

(b) total iron is expressed as if all iron present were present as $Fe_2O_3$;

(c) the transmittance data in the Table below and throughout are based on the nominal glass thickness reported in the table.

In accordance with the provisions of the patent statutes, the present invention has been described in what is considered to represent its preferred embodiment. It should be noted, however, that the invention can be practiced otherwise as described, without departing from its spirit and scope.

TABLE I

| Example | Color | wt % $Fe_2O_3$ (Rouge) | wt % Mxn Y | wt % Tot $Fe_2O_3$ | wt % $TiO_2$ | $Co_3O_4$ | Se (ppm) |
|---|---|---|---|---|---|---|---|
| | | | | @ 5.6 mm thickness | | | |
| 1 | clear (LOF) | 0.12 | | 0.12 | | | |
| 2 | clear | | 0.045 (FexN) | 0.12 | | | |
| 3 | bronze (LOF) | 0.34 | | 0.34 | | 43 | 13 |
| 4 | bronze | 0.236 | 0.1 (FexN) | 0.36 | | 16 | 96 |
| 5 | grey (LOF) | 0.285 | | 0.285 | | 80 | 10 |
| 6 | grey | 0.592 | 0.1 (FexN) | 0.717 | | | 77 |
| 7 | blue green | | 0.5 (FexN) | 0.25 | 0.782 | | |
| 8 | green | 0.734 | 0.12 (FexN) | 0.893 | | | |
| 9 | green | 0.679 | 0.175 (FexN) | 0.846 | | | |
| 10 | green | | 0.7 (FexN) | 0.95 | | | |
| 11 | blue green | | 0.5 (ZnxN) | 0.12 | 0.5 | | |
| 12 | blue green | | 0.5 (ZnxN) | 0.25 | 0.5 | | |
| 13 | green | | 0.8 (ZnxN) | 0.12 | 0.8 | | |
| 14 | blue green | | 0.5 (TiN) | 0.12 | 0.5 | | |
| 15 | blue green | | 0.5 (TiN) | 0.25 | 0.5 | | |
| 16 | blue | | 0.8 (TiN) | 0.12 | 0.8 | | |
| 17 | blue | | 0.5 ($Si_3N_4$) | 0.12 | 0.5 | | |
| 18 | blue | | 0.74 ($Si_3N_4$) | 0.12 | 0.74 | | |
| | | | | @ 4 mm thickness | | | |
| 19 | green (EZk) | | 0.8 | | 0.8 | 0.4 | |
| 20 | green | | 0.6 (FexN) | 0.25 | 0.85 | | |
| 21 | dk grey (Gal) | 1.44 | | | 1.44 | 238 | 2 |
| 22 | dk grey | 1.37 | 0.18 (FexN) | | 0.681 | 189 | 62 |

| Example | NiO (ppm) | ILLA | DSHT | ILLC | Tuv | L* | a* | b* |
|---|---|---|---|---|---|---|---|---|
| 1 | | 87.9 | 76.9 | 88 | 72.4 | 95.3 | -2.2 | 0.02 |
| 2 | | 88.2 | 78.3 | 89 | 69.9 | 95.1 | -1.89 | -0.09 |
| 3 | | 56.1 | 56 | 55 | 34.7 | 79.1 | 1.68 | 6.14 |
| 4 | | 59.2 | 56.9 | 56.74 | 14.4 | 80.3 | 4.23 | 13.51 |
| 5 | 84 | 45.8 | 47.6 | 46 | 40.9 | 73.5 | 0.1 | -1.7 |
| 6 | | 54.9 | 47.3 | 51.97 | 13.1 | 77.26 | 4.45 | -3.09 |
| 7 | | 69.5 | 41.5 | 71.5 | 34.5 | 87.73 | -10.07 | 0.64 |
| 8 | | 72 | 46.2 | 73.27 | 29 | 88.58 | -9.03 | 4.27 |
| 9 | | 76.9 | 53 | 77.93 | 33.1 | 90.75 | -7.71 | 4.35 |
| 10 | | 69.4 | 41.9 | 71.5 | 27.1 | 87.84 | -10.2 | 4.15 |
| 11 | | 78.2 | 54.6 | 79.58 | 49.1 | 91.49 | -6.36 | -0.02 |
| 12 | | 75 | 48.8 | 76.81 | 46.4 | 90.24 | -7.82 | -1.12 |
| 13 | | 71 | 43.7 | 72.79 | 35.7 | 88.35 | -9.23 | 1.23 |
| 14 | | 69.2 | 41.8 | 71.26 | 45.3 | 87.61 | -8.99 | -1.56 |
| 15 | | 71.7 | 42.8 | 73.78 | 45.2 | 88.24 | -9.42 | -0.83 |
| 16 | | 62.3 | 32.7 | 64.76 | 32.8 | 84.36 | -12.74 | -0.75 |
| 17 | | 62.6 | 31.9 | 65.82 | 41.3 | 84.9 | -13.1 | -5.3 |
| 18 | | 75.1 | 49 | 76.73 | 44.9 | 90.2 | -7.6 | -0.1 |
| 19 | | 71.5 | 44.5 | 73 | 35 | 88.5 | -8.8 | 3.3 |
| 20 | | 70.5 | 42 | 72.2 | 34.1 | 87.6 | -9.55 | 2.8 |
| 21 | 273 | 17.6 | 15.2 | 18 | 9.2 | 49.2 | -3.9 | 3.3 |
| 22 | 274 | 13.6 | 10.2 | 13.39 | 5.4 | 43.34 | -3.15 | 12.38 |

In the claims:

1. A glazing produced by the admixing, heating and melting of a batch glass composition comprising:

a) a soda-lime-silica float glass batch mixture including from about 65 to about 80 weight percent $SiO_2$ from about 10 to about 20 weight percent $Na_2O$, from about 5 to about 15 weight percent CaO, from about 0 to about 10 MgO, from about 0 to about 5 weight percent $Al_2O_3$, from about 0 to about 5 weight percent $K_2O$, from about 0 to about 5 weight percent BaO, from about 0 to about 5 weight percent B2O3, from about 0 to about 5 weight percent Ga2O3;

b) an amount of at least one metal nitride; and c) an amount of an iron-containing compound or compounds so as to result in a finished glass having a total iron content, measured as Fe2O3, of about 0.1 to about 4.5 weight percent, wherein said glazing has an Illuminant A visible light transmittance of greater than 70% and a direct solar heat transmittance of less than 44% at a nominal thickness of 3–6 mm.

2. An automotive glazing unit, comprising two sheets of a soda-lime-silica glass integrally adhered together through an interposed layer of transparent resinous material, said glass including an amount of nitrogen, such nitrogen resulting from the admixing, melting, and heating of at least one metal nitride in a batch glass composition.

3. An automotive glazing unit as recited in claim 2 wherein said soda-lime-silica glass includes about 0.1 to 4.5 weight percent $Fe_2O_3$ (total iron).

4. An automotive glazing unit as recited in claim 2, wherein said glazing unit has an Illuminant A visible light transmittance of greater than 70% and total solar energy transmittance of less than 44%.

5. An automotive glazing unit as recited in claim 2, wherein said glazing unit has an Illuminant A visible light transmittance of greater than 75% and total solar energy transmittance of less than 49%.

6. An automotive glazing unit as recited in claim 2, wherein each of said glass sheets has a thickness in the range of from about 1.7 mm to about 2.5 mm.

\* \* \* \* \*